United States Patent [19]

Rosenquist

[11] Patent Number: 4,521,562
[45] Date of Patent: Jun. 4, 1985

[54] POLYCARBONATE RESIN IMPACT MODIFIED WITH POLYOLEFINS AND CONTAINING PARAFFIN DERIVATIVES

[75] Inventor: Niles R. Rosenquist, Evansville, Ind.

[73] Assignee: General Electric Company, Mt. Vernon, Ind.

[21] Appl. No.: 397,718

[22] Filed: Jul. 13, 1982

Related U.S. Application Data

[63] Continuation of Ser. No. 221,706, Dec. 31, 1980, abandoned.

[51] Int. Cl.$^3$ .................... C08L 69/00; C08K 5/10
[52] U.S. Cl. ................................................ 524/490
[58] Field of Search ........................................ 524/490

[56] References Cited

U.S. PATENT DOCUMENTS

| | | | |
|---|---|---|---|
| 3,431,224 | 3/1969 | Goldblum | 524/46 |
| 3,437,631 | 4/1969 | Cleveland | 2/410 |
| 3,864,428 | 2/1975 | Nakamura et al. | 525/67 |
| 4,082,715 | 4/1978 | Mercier | 524/295 |
| 4,131,575 | 12/1978 | Adelmann et al. | 524/311 |

Primary Examiner—Joseph L. Schofer
Assistant Examiner—Peter F. Kulkosky
Attorney, Agent, or Firm—Martin B. Barancik

[57] ABSTRACT

A polycarbonate composition having improved melt flow and improved impact strength after aging at elevated temperatures, comprising polycarbonate resin with polyolefins and a paraffin derivative. A preferred composition comprises, in admixture, a high molecular weight aromatic carbonate polymer and a minor amount of a polyolefin and pentaerythritol tetrastearate.

4 Claims, No Drawings

POLYCARBONATE RESIN IMPACT MODIFIED WITH POLYOLEFINS AND CONTAINING PARAFFIN DERIVATIVES

This is a continuation, of co-pending application Ser. No. 221,706, filed Dec. 31, 1980, now abandoned This invention relates to polycarbonate compositions and more particularly to modified polycarbonate compositions having additives to improve the melt flow and impact strength after aging at elevated temperatures.

BACKGROUND OF THE INVENTION

Polycarbonate polymers are excellent molding materials because products made therefrom have high impact strength, toughness, high transparency, wide temperature limits (high impact resistances below −60° C. and a UL thermal endurance rating of 115° C. with impact), good dimensional stability, high creep resistance and electrical properties which qualify it as sole support for current carrying parts.

Polycarbonates are, however, very difficult to fabricate from melts for the reason that melts thereof have exceptionally high viscosities. Attempts to overcome this difficulty by the incorporation with the polycarbonate of materials known to reduce the viscosity of other resins have generally been unsuccessful. Many conventional viscosity control agents appear to have little or no effect on the viscosity of polycarbonate. Other compounds known to lower the viscosity of resins caused degradation of p olycarbonate resins. Some compounds, conventionally employed to improve the workbility of polymers, produce an embrittling effect on polycarbonates when they are mixed therewith and the resin is subjected to elevated temperatures as in molding. Still other materials, while satisfactory stiffness modifying agents for other plastics, are too volatile to be incorporated with polycarbonates since polycarbonates have much higher melting points than many other thermoplasctis.

Another difficulty with polycarbonates is that they are subject to loss of their high impact strength upon aging at elevated temperatures. Attempts to overcome this difficulty by incorporation with the polycarbonate of impact modifiers such as polyolefins have been to some extent successful. However, these impact modified compositions will also undergo embrittlement if subjected to elevated temperatures for a sufficient period of time since these impact modifiers tend to only prolong the period of time until the embrittlement occurs.

SUMMARY OF THE INVENTION

In accordance with the present invention there is herein disclosed a polycarbonate composition comprising in admixture, a high molecular weight aromatic carbonate polymer and a minor amount of a polyolefin and a paraffin of the following formula:

wherein n has a value of from about 8 to about 60, and which is characterized by a straight or branched carbon chain and R is H or an organic radical which is unreactive with polycarbonate.

It has been discovered that, by admixing a minor amount of a polyolefin or polyolefins and a paraffin derivative or paraffin derivatives with a high molecular weight aromatic carbonate polymer, the resultant polycarbonate composition has reduced melt viscosity and less tendency to embrittle upon molding or upon aging at elevated temperatures than compositions containing either the impact modifying agent (the polyolefin) or the flow enhancing agent (the paraffin derivative) above, and thus retains its characteristic high impact strength.

Use of the term "paraffin derivatives" throughout this application is intended to means, and should be understood as meaning the class of aliphatic hydrocarbons characterized by a straight or branched carbon chain represented by the general formula:

which are commonly employed in the art as lubricating agents.

The paraffin derivatives of the instant invention are well known in the art and are prepared by well known methods.

DETAILED DESCRIPTION OF THE INVENTION

In the practice of the invention, a paraffin derivative is incorporated with a polyolefin into an aromatic polycarbonate composition. Polyolefins act as impact modifiers in polycarbonate compositions increasing the impact strength of the same. Suitable polyolefins for use in the present invention include, for example, polyethylene, polypropylene, polyisobutylene, ethylene propylene diene copolymer, and their oxides, copolymers and terpolymers thereof. Other polyolefins suitable for use herein will be apparent to those skilled in the art. The preferred polyolefins are polyethylene and polypropylene. These polyolefins and their oxides, copolymers and terpolymers are available commercially.

The amount of the polyolefin present in the composition of the present invention can range from about 2.0 parts to about 8.0 parts, by weight, per hundred parts of the aromatic polycarbonate. Preferably, the polyolefin is present in amounts of from about 3.5 parts to about 4.5 parts, by weight, per hundred parts of the aromatic polycarbonate. In the practice of the present invention the useful paraffin derivatives include those having carbon chain lengths ranging from about 8 carbon atoms to about 60 carbon atoms. The paraffin can have organic functional groups attached to the carbon chains or can be free of organic functional groups. The functional organic groups which can be bonded to the carbon chain of the paraffins include those organic groups which are unreactive with the polycarbonate resin employed, such as carboxylate esters, carbonate esters, ethers, aryls and vinyls.

The amount of paraffin derivatives employed in the practice of this invention may vary from about 0.10 to about 1.0 parts per hundred parts of aromatic carbonate polymer. Preferably, these paraffins are employed in amounts of from about 0.60 to about 0.80 parts per hundred parts of aromatic carbonate polymer.

In the practice of this invention, the high molecular weight aromatic polycarbonates which can be employed herein, are homopolymers and copolymers and mixtures thereof which have an intrinsic viscosity of 0.40 to 1.0 dl./g. as measured in methylene chloride at 25° C. The aromatic polycarbonates are generally prepared by reacting a dihydric phenol with a carbonate precursor. Typical of some of the dihydric phenols which can be employed in the practice of this invention, are bisphenols, such as bis(4-hydroxyphenyl) methane, 2,2-bis(4-hydroxyphenyl) propane (hereinafter referred to as bisphenol-A), 2,2-bis(4-hydroxy-3-methylphenyl) propane, 4,4-bis(4-hydroxyphenyl) heptane, 2,2-bis(4-hydroxy-3,5-dichlorophenyl) propane, 2,2-bis(4-hydroxy-3,5-dibromophenyl) propane, and the like; dihydric phenol ethers such as bis(4-hydroxyphenyl) ether, bis(3,5-dichloro-4-hydroxyphenyl) ether, and the like; dihydroxydiphenyls such as p,p'-dihydroxydiphenyl, 3,3'dichloro-4,4'-dihydroxydiphenyl, and the like; dihydroxyaryl sulfones such as bis(4-hydroxyphenyl) sulfone, bis(3,5-dimethyl-4-hydroxyphenyl) sulfone, and the like; dihydroxy benzenes, resorcinol, hydroquinone, halo- and alkyl-substituted dihydroxy benzenes such as 1,4-dihydroxy-2,5-dichlorobenzene, 1,4-dihydroxy-3-methylbenzene and the like; and dihydroxy diphenyl sulfoxides such as bis(4-hydroxyphenyl) sulfoxide, bis-(3,5-dibromo-4-hydroxyphenol) sulfoxide, and the like. A variety of additional dihydric phenols are also available to provide carbonate polymers and are disclosed in U.S. Pat. Nos. 2,998,835; 3,028,365 and 3,153,008. Also suitable for preparing the aromatic carbonate polymers are copolymers prepared from any of the above copolymerized with halogen-containing dihydric phenols such as 2,2-bis(3,5-dichloro-4-hydroxyphenyl) propane, 2,2-bis(3,5-dibromo-4-hydroxyphenyl) propane, and the like.

It is, of course, possible to employ two or more different dihydric phenols or a copolymer of a dihydric phenol with glycol or with hydroxy or acid-terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein, are ca-bonyl bromide, carbonyl chloride and mixtures thereof. Typical of the carbonate esters which may be employed herein, are diphenyl carbonate, di-(halophenyl) carbonates such as di-(chlorophenyl) carbonate, di-(bromophenyl) carbonate, di-(trichlorophenyl) carbonate, di-(tribromophenyl) carbonate, etc., di-(alkylphenyl) carbonate such as di-(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bi-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

The polycarbonates can also be made from a dihydric phenol, a dicarboxylic acid and carbonic acid. These are disclosed in U.S. Pat. No. 3,169,121 which is incorporated herein by reference.

The aromatic carbonate polymers of this invention are preferably prepared by employing a molecular weight regulator. An acid acceptor and a catalyst. The molecular weight regulators which may be employed in carrying out the process of this invention, include phenol, cyclohexanol, methanol, para-tertiarybutylphenol, parabromophenol, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkali earth metal.

The catalysts which are employed herein, can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also included herein are branched polycarbonates wherein a polyfunctional aromatic compound is reacted with the dihydric phenol and carbonate precursor to provide a thermoplastic randomly branched polycarbonate.

These polyfunctional aromatic compounds contain at least three functional groups which are carboxyl, carboxylic anhydride, haloformyl or mixtures thereof. Examples of these polyfunctional aromatic compounds which may be employed in the practice of this invention, include: trimellitic anhydride, trimellitic acid, trimellityl trichloroide, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acids or their acid chloride derivatives.

Also included herein are blends of a linear polycarbonate and a branched polycarbonate.

The composition of the instant invention may be prepared by blending the high molecular weight aromatic polycarbonate with the paraffin derivative and the polyolefin impact modifier by conventional methods. A plurality of polycarbonates, paraffins and polyolefins may also be blended.

Obviously, other materials can also be employed with the aromatic carbonate polymer of this invention and include such materials as anti-static agents, pigments, thermal stabilizers, ultraviolet stabilizers, reinforcing fillers and the like.

PREFERRED EMBODIMENTS OF THE INVENTION

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE 1

A polycarbonate composition was prepared by reacting essentially equimolar amounts of 2,2-bis(4-hydroxyphenyl) propane (referred to as bisphenol-A) and phosgene in an organic medium with triethylamine, aqueous sodium hydroxide and phenol. One hundred parts of the polycarbonate composition was then mixed with 4.2 parts of a high density polyethylene manufactured by the U.S. Industrial Chemicals Co. under the commercial designation LB742 and 0.75 parts of a paraffin derivative as set forth in Table 1. The resulting mixture was then fed into an extruder which was operated at between about 277° C. to about 293° C., and the extrudate was comminuted into pellets.

The melt flow rates were determined and are set forth in Table 1.

Additionally, the pellets were injection molded at about 299° C. into test bars of about 2½ in. by ½ in. by about ⅛ in. thick. The impact strength of these bars were measured according to the Notched Izod test, ASTM D-256. The impact strength is set forth in Table 1. The sample labelled CONTROL is the polycarbonate as prepared without the polyethylene or the paraffin derivative.

TABLE 1

| ADDITIVES | | MELT FLOW RATE gr./10 min. | IMPACT STRENGTH (ft. lb/in.) ⅛ inch Notched Izod | | |
|---|---|---|---|---|---|
| Impact Modifier (4.2 parts per hundred) | Paraffin (0.75 parts per hundred) | | As Molded | Aged 4 Hrs. at 125° C. | Aged 24 Hrs. at 125° C. |
| Control | Control | 15.1 | 14.7 | 1.5 | — |
| — | Pentaerythritol tetrastearate | 16.9 | 15.3 | 1.2 | — |
| Polyethylene | — | 14.9 | 13.3 | 11.3 | 3.6 |
| Polyethylene | Pentaerythritol tetrastearate | 16.9 | 12.7 | 11.7 | 9.5 |
| Polyethylene | di(nonylphenyl) carbonate | 15.9 | 12.7 | 10.0 | 7.3 |
| Polyethylene | Paraffin Wax | 17.8 | 12.7 | 10.3 | 7.0 |

The combination of the three ingredients listed above in order of increasing aged impact strength are polycarbonate and a paraffin derivative, polycarbonate alone, polycarbonate and polyethylene, then polycarbonate and polyethylene and a paraffin derivative.

It can be seen from the data in Table 1 that when a paraffin derivative and a polyethylene impact modifier are both incorporated into a high molecular weight aromatic polycarbonate an improvement in flow rate of the resultant resin is achieved accompanied by a marked improvement in impact strength after aging at an elevated temperature. The use of either the paraffin additive or the impact modifier separately would not provide such a desirable result.

EXAMPLE 2

A polycarbonate composition was prepared as in Example 1. One hundred parts of the polycarbonate composition was then mixed with 4.2 parts of the polyethylene mentioned in Example 1 and various amounts of pentaerythritol tetrastearate as set forth in Table 2. The resulting mixtures were then fed into an extruder which was operated at about 260° C. and the extrudate was comminuted into pellets.

The melt flow rates of the resulting polymers were measured as in Example 1. The melt flow rates are set forth in Table 2.

The pellets were molded into test bars, and the impact strength of the resultant polymers were determined as in Example 1. The impact strength is set forth in Table 2. The sample labelled CONTROL is the polycarbonate as prepared with 4.2 parts per hundred of polyethylene.

TABLE 2

| ADDITIVE Pentaerythritol Tetrastearate (Parts per hundred) | MELT FLOW RATE gr./10 min. | IMPACT STRENGTH (ft. lb/in.) ⅛ inch Notched Izod | | |
|---|---|---|---|---|
| | | As Molded | Aged 4 Hrs. At 125° C. | Aged 24 Hrs. At 125° C. |
| Control | 14.5 | 12.4 | 3.3 | 2.6 |
| 0.25 | 15.9 | 12.7 | 5.5 | 2.6 |
| 0.50 | 16.9 | 12.7 | 5.3 | 2.7 |
| 0.75 | 17.3 | 12.7 | 6.5 | 2.6 |
| 1.25 | 18.4 | 12.0 | 3.9 | 2.6 |

It can be seen from the data in Table 2 that optimum results can be obtained by employing the paraffin additive in amounts of about 0.75 parts per hundred based on the weight of the entire polymer composition. Overall, the samples in Table 2 did not perform as well as the aged Notched Izod testing as those in Table 1. This discrepancy is possibly due to the difference in extrusion temperature in preparing the two sets of samples.

EXAMPLE 3

A polycarbonate composition was prepared as in Example 1. One hundred parts of the polycarbonate composition was then mixed with 0.75 parts of a paraffin, pentaerythritol tetrastearate, and various amounts of a polyethylene, described in Example 1, as set forth in Table 3. The resulting mixtures were then fed into an extruder which was operated at from about 277° C. to about 293° C., and the extrudate was comminuted into pellets.

The melt flow rate of the resultant polymers were measured as in Example 1. The melt flow rate is set forth in Table 3.

The pellets were molded into test bars, and the impact strength of the resultant polymers were determined as in Example 1. The impact strength is set forth in Table 3.

TABLE 3

| Impact Modifier Polyethylene (parts per hundred) | MELT FLOW RATE gr/10 min. | IMPACT STRENGTH (ft. lb./in.) ⅛ in. Notched Izod | | |
|---|---|---|---|---|
| | | As Molded | Aged 4 Hrs. At 125° C. | Aged 24 Hrs. At 125° C. |
| 2.1 | 15.1 | 13.3 | 2.0 | 2.0 |
| 4.2 | 16.9 | 12.7 | 4.0 | 2.3 |
| 6.3 | 16.0 | 10.7 | 7.3 | 5.2 |

It can be seen from the data in Table 3 that optimum results were obtained by employing the polyolefin impact modifier in amounts of about 6.3 parts per hundred based on the weight of the entire polymer composition. Overall, the samples in Table 3 did not perform as well in the aged Notched Izod testing as those in Table 1. This discrepancy is possibly due to the difference in extrusion temperature in preparing the two sets of samples.

EXAMPLE 4

A polycarbonate composition was prepared in Example 1 containing 0.1% of a phosphite color stabilizer. One hundred parts of the polycarbonate was mixed with 4.2 parts of a polyolefin as set forth in Table 4 and 0.75 parts of a paraffin derivative also set forth in Table 4. The polyolefins employed were a high density polyethylene designated 3747 DMDJ manufactured by Union Carbide, a low density polyethylene designated 102 NA manufactured by Rexene and a polyethylene polypropylene copolymer designated X0398 or 18-S2 manufactured by Rexene.

The resulting mixtures were then fed into an extruder which was operated at from about 277° C. to about 293° C., and the extrudate was comminuted into pellets.

The melt flow rate of the resultant polymers were measured as in Example 1. The melt flow rate is set forth in Table 4.

The pellets were molded into test bars, and the impact strength of the resultant polymers were determined as in Example 1. The impact strength is set forth in Table 4.

| ADDITIVES | | MELT FLOW RATE gr./10 min. | IMPACT STRENGTH (ft. lb/in.) ⅛ in. Notched Izod | |
|---|---|---|---|---|
| Impact Modifier (4.2 parts per hundred) | Paraffin (0.75 parts per hundred) | | As Molded | Aged 4 Hrs. At 125° C. |
| Polyethylene #3474 DMDJ | — | 12.8 | 12.0 | 3.7 |
| Polyethylene #3474 DMDJ | Octadelyl vinyl ether | 17.4 | 12.0 | 4.6 |
| Polyethylene #3474 DMDJ | Stearoyl stearate | 15.6 | 12.66 | 6.2 |
| Polyethylene Rexene 102NA | — | 13.7 | 13.33 | 2.7 |
| Polyethylene Rexene 102NA | Octadecyl vinyl ether | 18.9 | 12.0 | 3.5 |
| Polyethylene Rexene 102NA | Stearoyl stearate | 17.0 | 12.0 | 8.0 |
| Polyethylene-polypropylene Rexene 0398 | — | 15.1 | 13.33 | 3.5 |
| Polyethylene-polypropylene Rexene 0398 | Octadecyl vinyl ether | 16.9 | 12.66 | 6.8 |
| Polyethylene-polypropylene Rexene 0398 | Stearoyl stearate | 17.9 | 12.8 | 10.1 |

It will thus be seen that the objects set forth above, among those made apparent from the preceding description are efficiently attained, and since certain changes may be made in carrying out the above process and in the composition set forth without departing from the scope of this invention, it is intended that all matters in the above description shall be interpreted as illustraive and not in a limiting sense.

What is claimed is:

1. A polycarbonate composition comprising in admixture, a high molecular weight aromatic carbonate polymer and a minor amount of a polyolefin and a paraffin of the following formula:

$$C_nH_{2n+1}R$$

wherein n has a value of from about 8 to about 60, and which is characterized by a straight or branched carbon chain and R is H or a carboxylic acid ester which is unreactive with polycarbonate, said polyolefin and paraffin derivative in quantities which reduce the melt viscosity and provide better impact resistance after aging at elevated temperature than either the polyolefin or paraffin derivative alone, said polyolefin derivative present from about 3.5 to about 8.0 parts per hundred parts of aromatic carbonate polymer and said paraffin derivative present in from about 0.1 to about 1.5 parts per hundred parts of aromatic carbonate polymer.

2. The composition of claim 1 wherein the paraffin derivative is pentaerythritol tetrastearate.

3. The composition of claim 1, wherein the polyolefin is selected from the group consisting of polyethylene, polypropylene, polyisobutylene, ethylene propylene, diene copolymer, copolymers and terpolymers thereof.

4. The composition of claim 1, comprising from about 3.5 parts to about 4.5 parts polyolefin per hundred parts of aromatic carbonate polymer.

* * * * *